United States Patent [19]

Soltis

[11] Patent Number: 5,031,934
[45] Date of Patent: Jul. 16, 1991

[54] VEHICULAR SUSPENSION POSITION SENSOR AND METHOD OF CALIBRATION

[75] Inventor: Michael W. Soltis, Livonia, Mich.
[73] Assignee: Ford Motor Company, Dearborn, Mich.
[21] Appl. No.: 501,565
[22] Filed: Mar. 30, 1990
[51] Int. Cl.$^5$ .............................................. B60G 17/00
[52] U.S. Cl. .............................. 280/840; 280/DIG. 1; 280/707
[58] Field of Search ............... 280/707, 840, 6.1, 6.11, 280/703, 704, DIG. 1; 267/64.16, 2; 188/299

[56] References Cited

U.S. PATENT DOCUMENTS

| | | | |
|---|---|---|---|
| 4,105,216 | 8/1978 | Graham et al. | 280/707 |
| 4,555,120 | 11/1985 | Frait et al. | 280/6.1 |
| 4,809,179 | 2/1989 | Klinger et al. | 280/840 |
| 4,836,578 | 6/1989 | Soltis | 280/840 |
| 4,838,563 | 6/1989 | Konishi et al. | 280/840 |
| 4,939,655 | 7/1990 | Majeed et al. | 280/840 |

Primary Examiner—Richard A. Bertsch
Attorney, Agent, or Firm—Raymond L. Coppiellie; Roger L. May

[57] ABSTRACT

A method for calibrating an automotive suspension position sensor including the steps of placing the sensor into a position corresponding to a predetermined ride height, applying a reference signal to the sensor, measuring the output signal value from the sensor, and adjusting the output signal value by means of an automatic calibrator associated with the sensor to achieve a predetermined desired signal value. An adjustable ride height sensing system for an automotive vehicle includes a sensor interposed between the chassis of the vehicle and a roadwheel so that the electrical impedance of the sensor will be a function of vertical position of the roadwheel with respect to the chassis and means for automatically adjusting the apparent impedance of the sensor so that the output of the sensor achieves a desired range of values.

16 Claims, 4 Drawing Sheets

VEHICULAR SUSPENSION POSITION SENSOR AND METHOD OF CALIBRATION

BACKGROUND OF THE INVENTION

1. Field of the Invention

This invention relates to a suspension position sensor for a vehicle, as well as to a method of calibrating such a sensor.

2. Disclosure Information

Vehicular suspensions employing adjustable suspension units typically utilize one or more sensors for detecting the position of one or more portions of the suspension with respect to either another part of the suspension itself or another part of the chassis of the vehicle. In other words, suspension position sensors are used to detect the vertical position of the roadwheels with respect to the chassis of the vehicle. In the case of vehicles using load leveling or air or hydropneumatic suspension systems, it is necessary to know the ride height of the vehicle to determine whether correction of the ride height is required. In the event, for example, that the ride height is lower than a prescribed "trim" limit, as determined by the height sensor, an adjustable suspension unit may be given a command to increase ride height. Conversely, in the event that the ride height exceeds the prescribed "trim" limit, the adjustable suspension unit may be given a command to lower, or decrease, the ride height.

In order to provide reliable information to the suspension unit, the height sensor must be calibrated. This involves ensuring that the output of the sensor corresponds to the correct vehicle ride height or wheel position with respect to the chassis of the vehicle. U.S Pat. No. 4,555,120 discloses a commonly employed type of suspension position sensor which must be mechanically adjusted to synchronize the sensor's output with the actual vehicle ride height. U.S. Pat. No. 4,105,216 discloses a motor vehicle level control circuit in which a pair of optical detectors interacts with a rotary shutter device to produce a first logic signal pair when the vehicle's ride height is in a trim region, and second and third logic signal pairs when the vehicle's ride height is either high or low and out of the trim region. As before, the sensor of the '216 patent must be manually adjusted in order to synchronize actual vehicle ride height with the sensor output.

It is an object of the present invention to provide an automotive suspension position sensor which may be calibrated remotely from the sensor and/or the vehicle.

It is a further object of the present invention to provide an automotive suspension position sensor which may be calibrated by means of a microprocessor.

It is yet a further object of the present invention to provide a suspension position sensor system which may be periodically recalibrated by a control system within the vehicle.

It is an advantage of the present system that a sensor system according to this invention will be able to compensate for drift of the output signal of the sensor.

Other objects, features and advantages of the present invention will become apparent to the reader of this specification.

SUMMARY OF THE INVENTION

According to the present invention, a method for calibrating an automotive suspension position sensor comprises the steps of (i) determining a desired output signal value for the sensor corresponding to a predetermined vehicle condition; (ii) placing the vehicle into the predetermined condition (iii) supplying power to operate the sensor; (iv) measuring the output signal value from the sensor; and (v) adjusting the output signal value by means of a calibrator associated with the sensor to achieve the desired output signal value. The output signal value may be adjusted by adjusting a resistive network associated with the sensor to achieve the desired output signal value from the sensor at the predetermined condition.

The sensor may comprise a variable resistance device adapted to be interposed between the chassis of a vehicle and a roadwheel so that the electrical resistance of the sensor will be a function of the vertical position of the roadwheel with respect to the chassis. Alternatively, the sensor may comprise a variable capacitance device interposed between the chassis of the vehicle and the roadwheel. The output signal value may be adjusted by permanently adjusting the value of a resistive network associated with the sensor to achieve the desired output signal value from the sensor. This permanent adjustment may be achieved by uncoupling one or more elements of the resistive network. Alternatively, the output signal value may be adjusted by temporarily adjusting the impedance of a network associated with the sensor to achieve the desired output voltage. This temporary adjustment may be worked by means of a computer processor which changes the value of the impedance, and thus functions as an automatic calibrator.

A system according to the present invention may thus comprise a sensor interposed between two relatively movable members of a vehicle, such as the chassis and roadwheel of a vehicle so that the electrical impedance of the sensor will be a function of the distance between the members, such as a function of the jounce position of the roadwheel with respect to the chassis, and means for automatically adjusting the apparent impedance of the sensor so that the output of the sensor achieves a desired range of values. The means for adjusting the apparent impedance of the sensor may comprise a computer processor which controls the resistance value of an electronically erasable potentiometer operatively associated with the sensor. Alternatively, the means for adjusting the apparent impedance of the sensor may comprise an external calibrator which changes the actual impedance of a network operatively associated with the sensor.

The network associated with the sensor may comprise a plurality of resistive elements connected in parallel or series with each other and in series with the sensor so that the actual resistance of the network may be changed by uncoupling one or more of the resistive elements from the network. The external calibrator may uncouple the resistive elements from the network by passing a current through the network having sufficient magnitude to breach one or more fusible elements which couple the resistive elements into the network. Another variation of the means for adjusting the apparent impedance of the sensor, an external calibrator may comprise a means for controlling the resistance value of an electronically erasable potentiometer operatively associated with the sensor. As yet a further variation, the means for adjusting the apparent impedance of the sensor may comprise an external calibrator which controls the resistance value of an electronically erasable potentiometer operatively associated with the sensor to control a calibrating voltage applied as one input to a differential amplifier, with another input to the amplifier comprising the signal voltage from the sensor. In this case, the output for the differential amplifier will be taken as the output of the ride height sensor.

In one embodiment, the sensor operatively associated with the chassis of the vehicle and the roadwheel may comprise a potentiometer having a wiper positioned according to the vertical position of the roadwheel. In this case, the means for adjusting the output of the sensor as measured at the wiper may comprise a computer processor, for example, which changes the actual impedance of a network operatively associated with the sensor. The network may be interposed between one terminal of the sensor and a power supply feeding the sensor. Alternatively, the network may be interposed between one terminal of the sensor and a ground potential terminal.

In the event that it is desired to employ a sensor system according to the present invention in an automatic load leveling system, such a load leveling system could comprise an adjustable suspension unit for controlling the ride height of the vehicle, the suspension position sensor, and a control module for operating the adjustable suspension unit, using information from at least the position sensor. The control module includes means for instructing the suspension unit to place the vehicle at a predetermined ride height position which may, for example, comprise full jounce or full rebound position, and means for adjusting the output of the sensor to a desired value corresponding to the predetermined ride height. The external hardware associated with the sensor according to this invention may thus be described as compensation means for compensating the output of the sensor so that the output of the compensation means achieves the desired range of values, with the compensation means including a computer processor which controls a calibrating voltage to provide it as input to a differential amplifier, with the sensor providing a second input to the amplifier, so that the output of the amplifier may be used as the final output of the sensor.

DETAILED DESCRIPTION OF THE PREFERRED EMBODIMENTS

Figure 1:
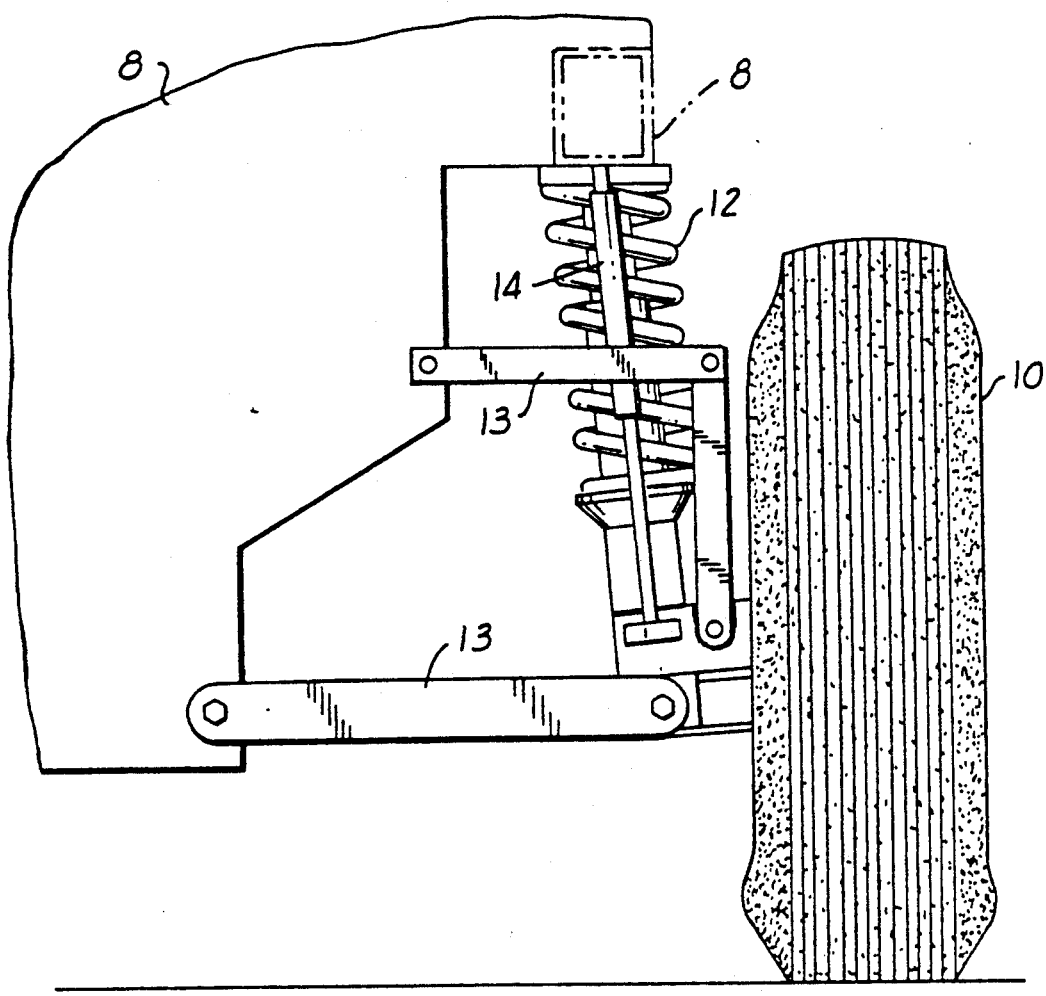
FIG. 1 is a frontal elevation of an automotive suspension equipped with a telescoping, or linear, position sensor suitable for use with a system according to the present invention.
Figure 2:
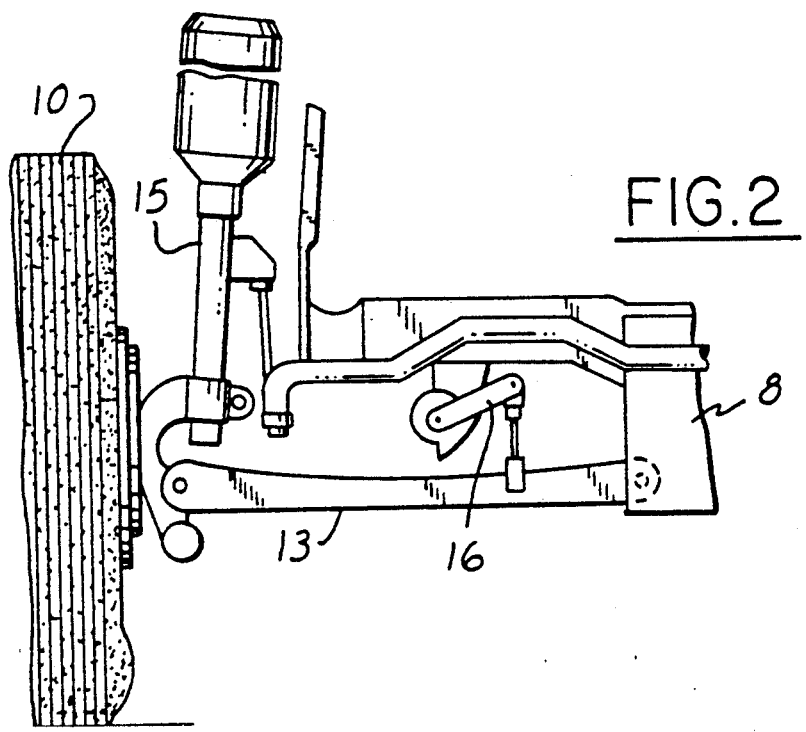
FIG. 2 is a frontal elevation of an automotive suspension equipped with a rotary suspension position sensor suitable for use as part of a system according to the present invention.

As shown in FIGS. 1 and 2, a sensor system according to the present invention is intended for use with vehicular suspension systems. In FIG. 1, roadwheel and tire assembly 10 is supported by means of coil spring 12 and carried by means of conventional control arms 13. As the roadwheel moves in the jounce and rebound directions, linear position sensor 14 which may comprise, for example, an LVDT, a potentiometer, a variable capacitance device or some other type of device which provides an output signal which varies in a predetermined relationship with the extent to which the device is telescoped with respect to itself, provides a signal indicative of the roadwheel position with respect to chassis 8. Similarly, in FIG. 2, rotary position sensor 16, coupled to lower control arm 13, provides a signal disclosing the vertical position of roadwheel and tire assembly 10 with respect to chassis 8. To one of ordinary skill in the art, it should be apparent that sensor 16 could comprise a rotary potentiometer, a rotary variable capacitor, or other type of device capable of translating rotational movement into a variable electrical value. The present invention will be described with respect to a suspension position sensor; however, it should be apparent to those skilled in the art that other types of analog sensors, such as accelerometers, load cells or pressure transducers, also may be calibrated using a system of the present invention.

Figure 3:
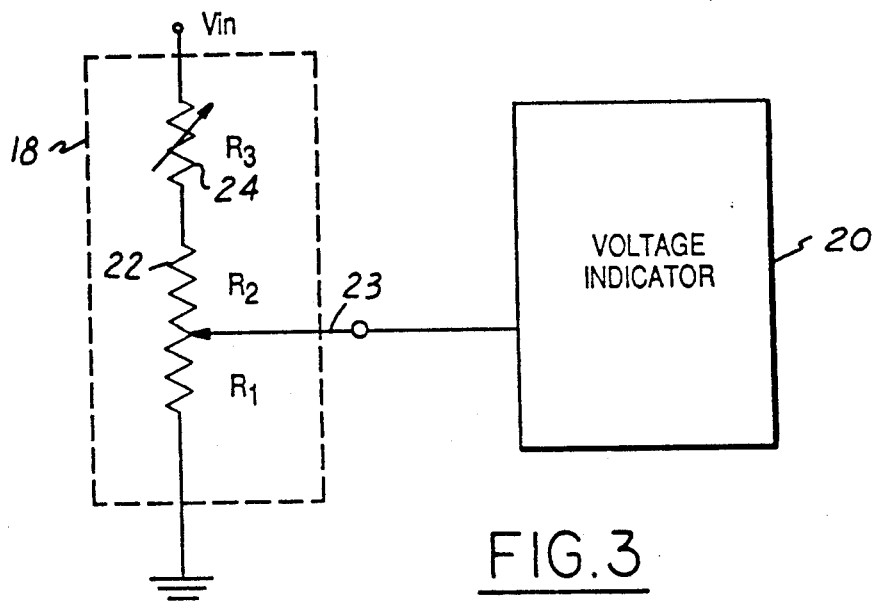
FIG. 3 is a schematic representation of a suspension position sensor system utilizing a potentiometer for mechanical calibration of the sensor.

FIG. 3 shows a schematic representation of a system for manually calibrating a suspension position sensor comprising a sensor assembly 18 which includes a slidewire potentiometer 22 and a trim potentiometer 24. The trim potentiometer 24 adjusts the output signal of slidewire potentiometer 22 during the calibration of sensor assembly 18.

Calibrating sensor assembly 18 involves the steps of installing the position sensor 18 in the vehicle, placing the vehicle suspension in a predetermined condition so that the position of the wheel relative to the vehicle chassis is known and mechanically adjusting the potentiometer 24 until the output signal of slidewire potentiometer 22 reaches a predetermined value as indicated by voltage indicator 20. The sensor assembly 18 is calibrated when the output signal of potentiometer 22 reaches the predetermined value corresponding to the known position.

It will be appreciated that the output signal of potentiometer 22 is calculated according to the following formula:

$$V_{out} = V_{in} \times \left( \frac{R1}{R1 + R2 + R3} \right)$$

The output signal of sensor assembly 18 may be adjusted by manually changing the value of R3, provided that R3 is physically accessible to an operator. It should be apparent that the value of R3 can be changed in any of a number of known methods, such as by turning an associated screw assembly with a screwdriver or by turning a dial.

Figure 4:
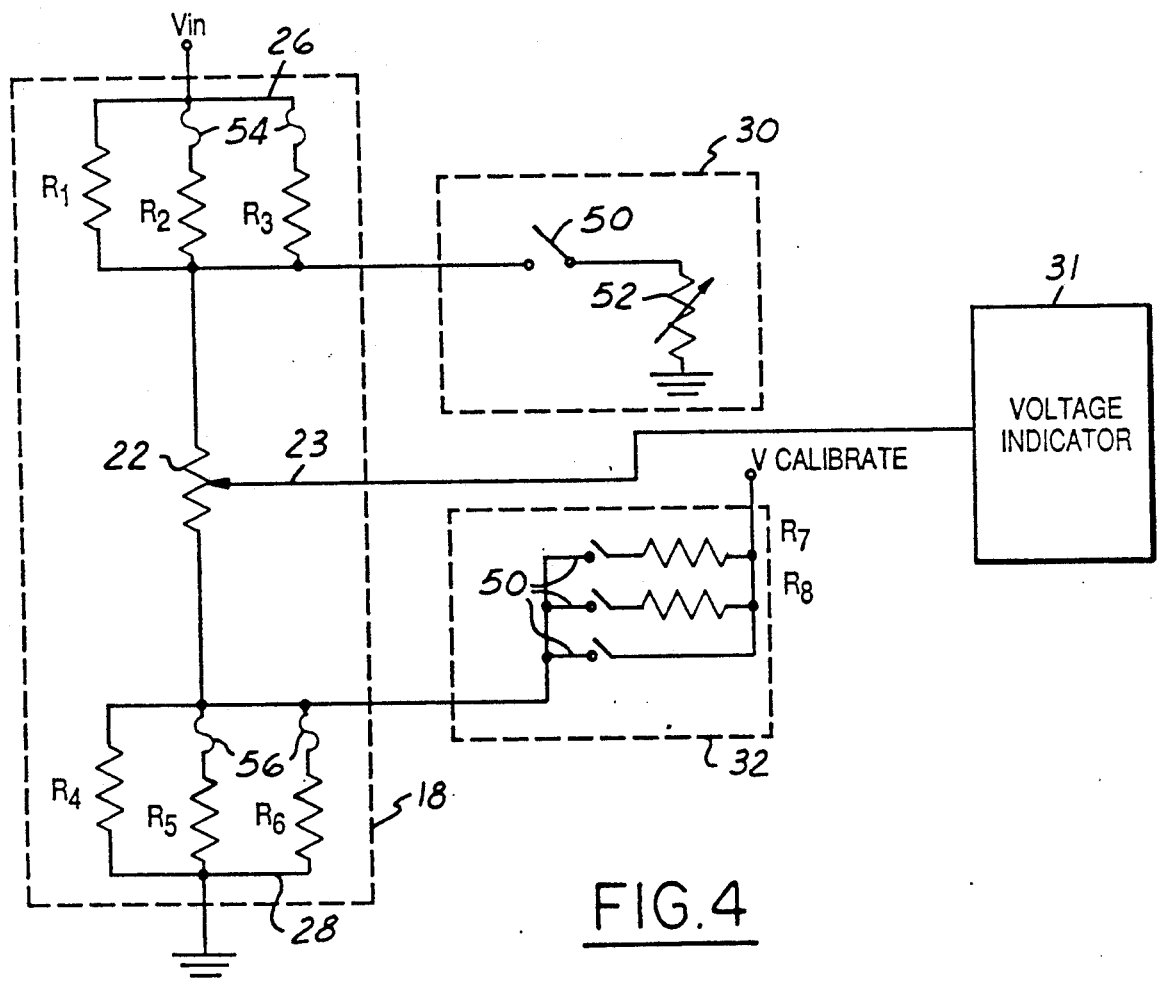
FIG. 4 is a schematic representation of a system for manually calibrating a suspension position sensor according to the present invention.
Figure 5:
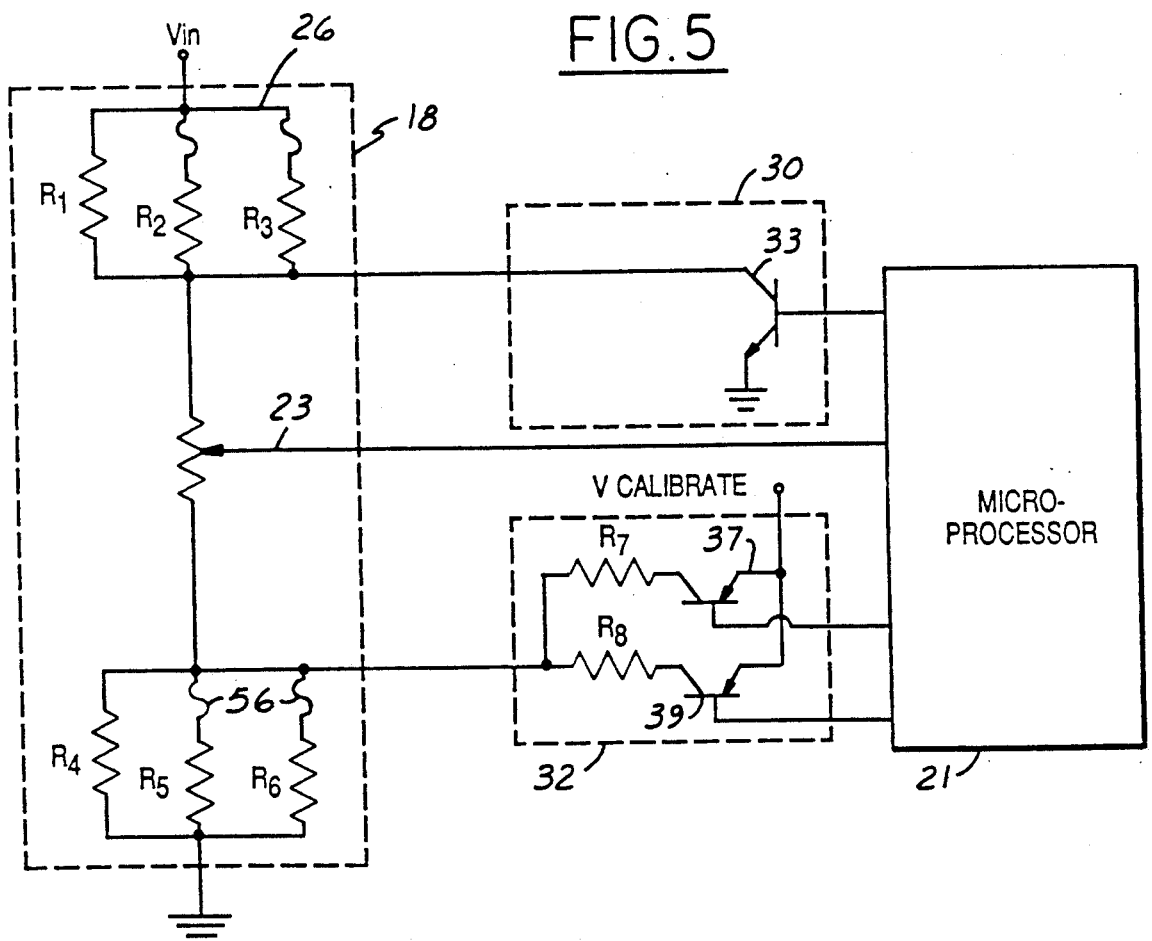
FIG. 5 is a schematic representation of a system for automatically calibrating a suspension position sensor according to the present invention.

FIGS. 4 and 5 show schematic representations of systems for electrically calibrating a position sensor structured in accord with the present invention. The system of FIG. 4 is manually calibratable from a location remote from the sensor and vehicle, while the system depicted in FIG. 5 is automatically, or self-calibratable. Like or equivalent structures in each figure will be given the same reference numerals for ease of explanation.

In FIGS. 4 and 5, as in FIG. 3, slidewire potentiometer 22 is the sensing element of sensor assembly 18. Two resistor banks, upper resistor bank 26 and lower resistor bank 28 are used by external calibrators 30, 32 to adjust the output signal of potentiometer 22. The output signal of potentiometer 22 can be read either by a voltage indicator, 31 in FIG. 4, or by a microprocessor, 21 in FIG. 5. External calibrators 30 and 32 control the output signal adjustment of potentiometer 22 as determined through wiper 23 and as will be described below.

As shown in FIG. 4, external calibrator 30 comprises a variable potentiometer 52, adjustable to increase or decrease the amount of current flowing through upper resistor bank 26 during the calibration process. External calibrator 30 is operated by first closing switch 50 and then adjusting variable potentiometer 52 to cause an appropriate amount of current to flow through upper resistor bank 26. Variable potentiometer 52 may be adjusted in any of known manners, such as by turning the dial of a rotary potentiometer or moving the slide of a linear potentiometer. External calibrator 30 of FIG. 5 comprises a bipolar transistor 33, adjustable by microprocessor 21. Adjusting the base current of transistor 33 causes an appropriate amount of current to flow through upper resistor bank as described above. The electrical current capacity of external calibrator 30 must exceed the sum of the capacity of the fuses 54 in the position sensor so that sufficient current can pass through calibrator 30 to breach fuses 54 without damaging sensor 18 or calibrator 30 as will be explained below.

Prior to adjusting potentiometer 52 or transistor 33, a predetermined voltage value from slidewire potentiometer 22 corresponding to a known position height is calculated. This calculation can be performed internally in microprocessor 21 or supplied externally in any of a number of known methods. To calibrate sensor assembly 18, the voltage value of the actual output signal of potentiometer 22 must be adjusted until it is sufficiently close to or equals the desired or calculated value as determined by voltage indicator 31 or microprocessor 21.

As illustrated in FIGS. 4 and 5, each of resistor banks 26 and 28 comprises a plurality of resistors $R_1-R_3$ and $R_4-R_6$, respectively, connected in parallel. Fusible elements 54 are connected to two of the three resistors in each resistor bank and, when breached, short circuit the respective resistor from its resistor bank. Those skilled in the art will realize that at least one resistor in each resistor bank must not be linked with a fusible element so that current will flow through the resistor bank when all fusible elements have been breached.

Regulating the current flow through the upper and lower resistor banks varies the voltage value of the actual output signal of potentiometer 22. Those skilled in the art will appreciate that the value of resistor banks 26 and 28 may be given by the following expression:

$$R_b = \left(\frac{1}{R_x} + \frac{1}{R_y} + \frac{1}{R_z}\right)^{-1}$$

where $R_b$ is the resistivity of resistor banks 26 or 28, $R_x$, $R_y$ and $R_z$ represent the values of resistors R1, R2, and R3, respectively, of resistor bank 26 and R4, R5, and R6, respectively, of resistor bank 28. As can be seen in the above equation, the resistivity value of the resistor banks can be adjusted by deleting each of resistors R1 through R6 from the respective resistor bank.

Regulating the amount of current flow through upper resistor bank 26 will cause one or more of fusible elements 54 to melt, thereby uncoupling resistors R2 and/or R3 from upper resistor bank 26 as desired. Breaching fuses 54 in upper resistor bank 26 causes a voltage decrease in the output of potentiometer 22 as determined by wiper 23 and voltage indicator 31 or microprocessor 21 in an attempt to place the voltage value of the output signal to a predetermined value in the calibration process. It is desirable to have fuses 54 breach singularly, causing a voltage decrease with each breach.

In similar fashion, external calibrators 32 cause an appropriate amount of current to flow through lower resistor bank 28 to breach fusible elements 56 during the calibration process. External calibrator 32 of FIG. 4 includes resistors R7 and R8 associated with switches 50, while transistors 37, 39 are shown in FIG. 5. Closing one or more switches 50 in external calibrator 32 increases the current flowing through lower resistor bank 28 and thereby causes one or more of fusible elements 56 to be breached. Breaching fuses 56 causes an increase in the voltage output of potentiometer 22 during the calibration process. In FIG. 4, switches 50 are closed manually in any of a number of known ways, such as by physically pushing a closing switch. In FIG. 5, microprocessor 21 controls transistors 37, 39 to increase the current flowing through lower resistance bank 28.

Figure 4A:
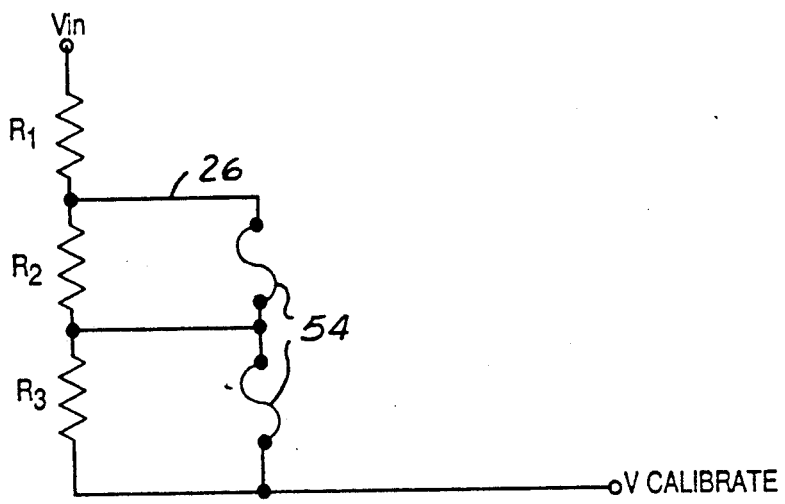
FIG. 4A is a schematic representation of a resistive network suitable for use with a system according to the present invention.

FIG. 4A shows a schematic representation of an alternative resistive network which may be utilized in place of the parallel networks 26, 28 described above. In FIG. 4A, resistors R1, R2 and R3 are connected in series with each other and are connected in parallel with fusible elements 54. As illustrated in FIG. 4A, resistors R2 and R3 are short circuited from the resistive network because of fusible elements 54. Breaching fusible elements 54 adds resistors R2 and R3 to the resistive network. Those skilled in the art will appreciate that the value of the resistive network shown in FIG. 4A may be given by the following expression:

$$R_b = R_1 + R_2 + R_3$$

The resistivity value of the resistor bank can be adjusted by adding each of resistor R2 and R3 to the resistor bank. It should be apparent to those skilled in the art that each resistor bank shown in FIGS. 4, 4A and 5 need only contain at least two resistors each and may contain many more than the illustrated three. The invention is not meant to be limited to resistor banks having only three resistors and two fusible elements.

It should be apparent to those skilled in the art that the systems illustrated in FIGS. 4 and 5 may utilize external calibrators having the same structure, such as a system having two calibrators as in 30 in place of one calibrator 30 and one calibrator 32. Similarly, a system may employ two calibrators having the structure shown in calibrator 32 in place of one calibrator as in 30 and one as in 32. It should also be apparent that external calibrators 30, 32 may be manufactured integrally with microprocessor 21 or may be separate units that are removed from the system after calibration is complete.

Those skilled in the art will appreciate in view of this disclosure that the resistive networks disclosed in FIGS. 4 and 5 are merely illustrative of a class of variable resistive or variable capacitative devices suitable for use with a system according to the present invention. In any event, the electrical impedance of the sensor will be a function of the vertical position of the roadwheel with respect to the chassis. When combined with the illustrated control system, the apparent impedance of the sensor may be electronically calibrated so that the output of the sensor achieves a desired range of values. It should also be apparent that the sensor signal could also be converted to an output frequency, duty cycle or other form suitable for transmission to the controller or other device that uses the sensor measurement.

Figure 6:
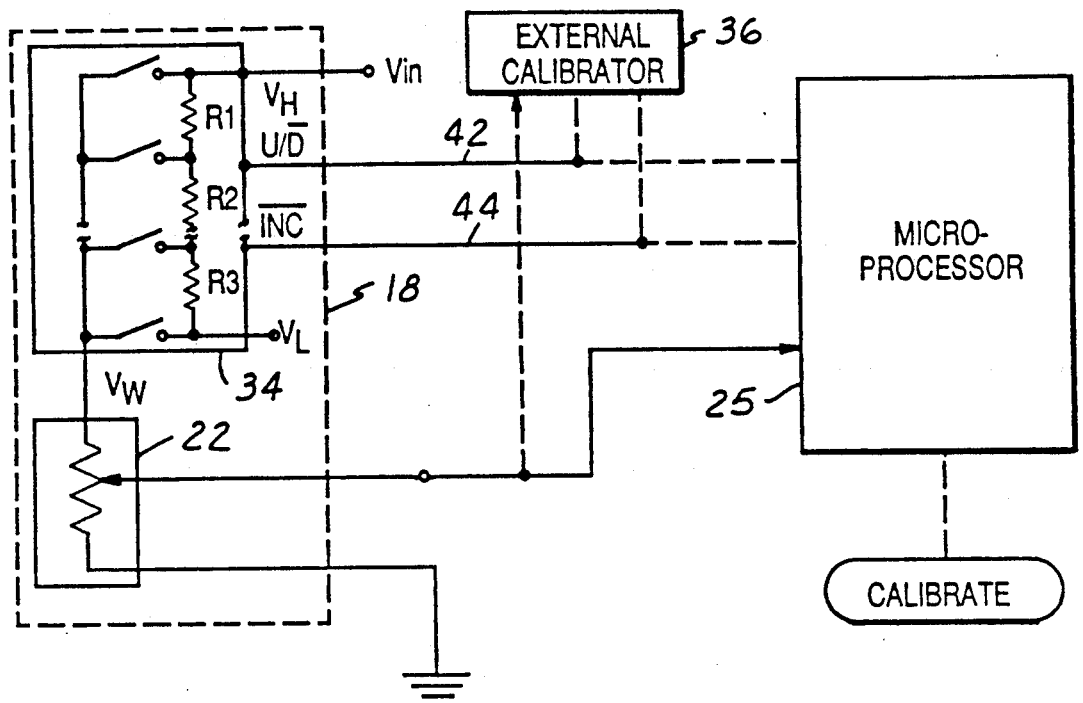
FIG. 6 is a schematic representation of a second embodiment of a system for automatically calibrating a suspension position sensor according to the present invention.

FIG. 6 illustrates a schematic representation of a second embodiment of a system according to the present invention in which the means for adjusting the apparent impedance of the sensor 18 comprises a microprocessor 25 for controlling the resistance value of an electronically erasable, digitally controlled potentiometer 34 operatively associated with the sensor. Acting together, microprocessor 25 and electronically erasable potentiometer 34 adjust the apparent impedance of slidewire potentiometer 22 by altering the resistance of current flowing through the electronically erasable potentiometer 34. A solid state non-volatile potentiometer, such as model X9MME by Xicor ®, is useful for practicing the present invention. Other suitable electronically erasable potentiometers are commercially available.

As is further shown in FIG. 6, the potentiometer 34 comprises an array of 99 resistive elements. Between each element and at either end are tap points $V_h$ and $V_l$ accessible to a wiper element (not shown). The position of the wiper element on the array is controlled by microprocessor 25 by means of lines 42 and 44. The microprocessor 25 increases or decreases the impedance of the resistor array 34 through line 42. The microprocessor 25 directs which resistive elements should be employed in the calibration process through line 44. Once sensor assembly 18 is calibrated, microprocessor 25 will be able to read out the position of the suspension by means of the signal available at wiper 23 of slidewire potentiometer 22. Those skilled in the art will appreciate in view of this disclosure that although the electronically erasable potentiometer 34 of FIG. 6 is shown as being interposed between one terminal of sensor 22 and a voltage power supply, the potentiometer 34 could be positioned between one terminal of sensor 22 and the ground terminal.

In the event that it is not desirable to have a calibration capability incorporated into microprocessor 25, an external calibrator, 36, could be provided. This external calibrator functions in the same manner as the microprocessor for the purposes of calibrating sensor 22. As before, the external calibrator controls the resistance value of the resistive array 34 to calibrate the output of slidewire potentiometer 22.

Regardless of whether the calibration capabilities are performed automatically by the microprocessors or manually, the first step in calibrating the sensor of FIGS. 3, 4, 5 and 6 is to determine a desired output signal, or voltage, of the position sensor at some predetermined suspension condition such as full jounce or full rebound. This value typically is a specification, the result of a calculation or a measurement on a test vehicle. The desired output signal is the value that the vehicle control system expects the sensor output to be when the vehicle suspension is in the predetermined condition. Next, the position sensor is installed in the vehicle and connected to the appropriate electrical contacts. The position sensor is calibrated on the vehicle instead of at the point of manufacture because vehicle attachments are the greatest source of variability of the sensor output signal. For example, if two sensors are installed successively in the same vehicle and the suspension adjusted until the sensor output is 2.5 volts, the suspension position may vary by 0.1 inches. If, however, the same sensor is installed on two different vehicles and the suspension adjusted until the sensor output is 2.5 volts, the suspension positions will vary by a much greater amount, perhaps 0.5 inches. Those skilled in the art will realize that this disclosure is not to be limited to calibrating the sensor while only on the vehicle, it being understood that the a sensor of the present invention may be calibrated when not on the vehicle.

The next step in calibrating a position sensor of the present invention is to supply power to the sensor and read the output voltage through either the microprocessor or voltage indicator. The sensor output is adjusted to the desired output value by breaching fuses in either of the external calibrators as explained earlier or by manual manipulation of the calibrators. After the initial adjustment of the sensor, the external calibrators are turned off and a new reading of the sensor output value is obtained. If the output value equals the desired value, the sensor is calibrated and no further adjustment is necessary. If the output value does not equal the desired value, the sensor is adjusted through the external calibrators until the output value reaches the predetermined value or until all the fuses have been breached. A sufficient number of fuses should be provided to provide a reasonable amount of adjustment capability.

According to another aspect of the present invention, a suspension system for a vehicle includes an adjustable suspension unit for controlling the ride height of a vehicle such as suspension unit 15 of FIG. 2, as well as the microprocessor and sensor assembly shown in FIG. 6. Those skilled in the art will realize that suspension system sensors, particularly those operating according to analog principles, may be subject to electronic drift with age. To compensate for drift, microprocessor 25 sends a signal to adjustable suspension unit 15 to place the vehicle at a predetermined ride height position e.g. full jounce, so that the corresponding signal read from the height sensor 22 (16 in FIG. 2) is adjusted to the desired value relating to the predetermined ride height. The adjustable suspension unit could place the vehicle in either the lowest or the highest ride height in order to permit this adjustment. Such adjustment could be performed periodically during the life of the vehicle to assure that accurate ride height information is available at all times.

Figure 7:
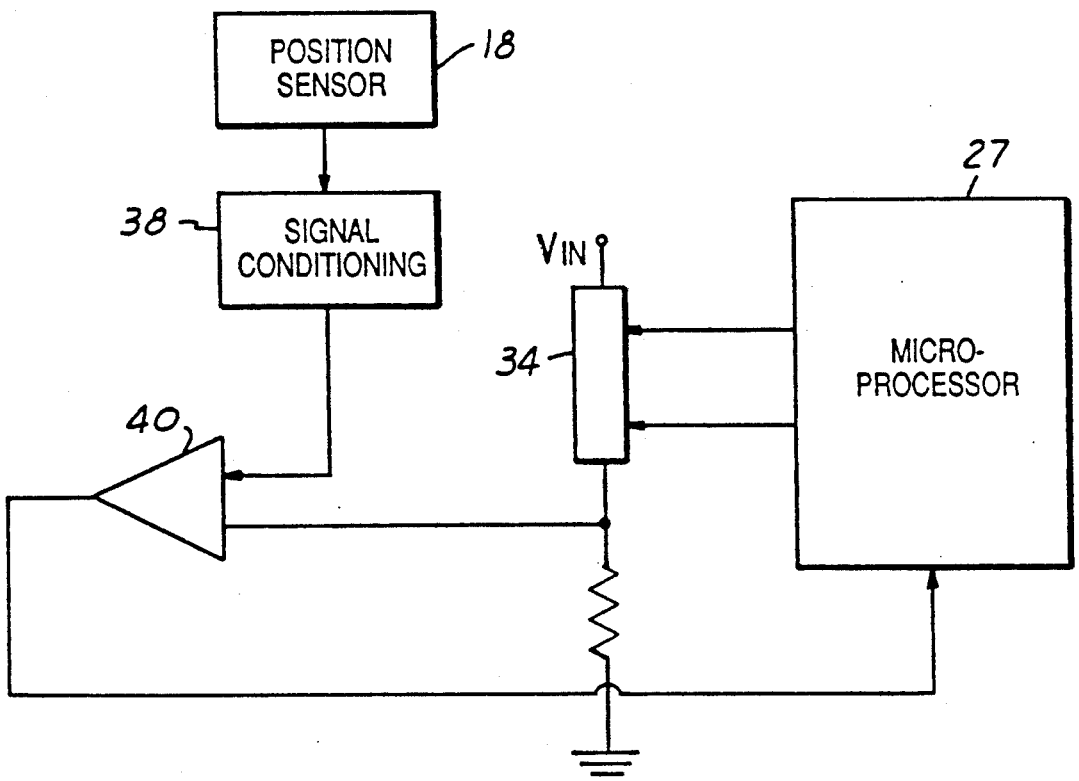
FIG. 7 is a schematic representation of a third embodiment of a system for automatically calibrating a suspension position sensor according to the present invention.

FIG. 7 illustrates a schematic representation of a third embodiment of a suspension position sensor system according to the present invention. As shown in FIG. 7, position sensor 18, comprising either a variable resistance, a variable reluctance, a variable capacitance, a Hall Effect sensor or other type of sensor known to those skilled in the art and suggested by the disclosure, is connected with microprocessor 27, in combination being a part of a network further comprising signal conditioning module 38. Signal conditioning module 38 converts the position sensor signal to an analog voltage signal, which is in turn fed to differential amplifier 40. Electronically erasable potentiometer 34, controlled by microprocessor 27, provides another input to differential amplifier 40. Potentiometer 34, an array of 99 resistive elements as described above with reference to FIG. 7, provides a calibrating voltage to the differential amplifier 40. The output of differential amplifier is a calibrated analog signal corresponding to the position of the vehicle's ride height as read by position sensor 18. Accordingly, taken together, microprocessor 27, electronically erasable potentiometer 34 and differential amplifier 40 comprise a compensation means for compensating the output of sensor 18 so that the output of the compensation means achieves a desired range of values. The sensor is calibrated as generally described above and the microprocessor could be instructed to periodically recalibrate the output of differential amplifier 40 so that accurate position signal information is available. Differential amplifier 40 and electronically erasable potentiometer 34 can be physically located in either the housing for microprocessor 27 or the housing of the position sensor 18.

Those skilled in the art will appreciate in view of this disclosure that a variety of sensors will be compatible with the system according to the present invention. Similarly, the calibration function of the present invention could be incorporated into an external calibrator or into the microprocessor which controls other vehicular functions. These and all other modifications of the present invention are possible without departing from the spirit and scope of the appended claims.

I claim:

1. An adjustable ride height sensing system for an automotive vehicle, comprising:
   a sensor interposed between the chassis of a vehicle and a roadwheel, so that electrical impedance of said sensor will be a function of the vertical position of said roadwheel with respect to said chassis; and
   means for adjusting the apparent impedance of said sensor so that an output signal of said sensor achieves a desired range of values.

2. An adjustable ride height sensing system according to claim 1, wherein said means for adjusting the apparent impedance of said sensor comprises a computer processor operative to control the resistance value of an electronically erasable potentiometer operatively associated with said sensor.

3. An adjustable ride height sensing system according to claim 1, wherein said means for adjusting the apparent impedance of said sensor comprises an external calibrator operative to change the actual impedance of a network operatively associated with said sensor.

4. An adjustable ride height sensing system according to claim 3, wherein said network comprises a plurality of resistive elements connected with each other and with said sensor, so that the actual resistance of said network may be changed by uncoupling one or more of said resistive elements from said network.

5. An adjustable ride height sensing system according to claim 4, wherein said network further includes at least one fusible element coupled to at least one of said plurality of resistive elements.

6. An adjustable ride height sensing system according to claim 5, wherein said external calibrator uncouples said resistive elements from said network by passing a current through said network having sufficient magnitude to breach said at least one fusible element coupling said resistive elements into said network.

7. An adjustable ride height sensing system according to claim 1, wherein said means for adjusting the apparent impedance of said sensor comprises an external calibrator operative to control the resistance value of an electronically erasable potentiometer operatively associated with said sensor.

8. An adjustable ride height sensing system according to claim 1, wherein said means for adjusting the apparent impedance of said sensor comprises an external calibrator operative to control the resistance value of an electronically erasable potentiometer operatively associated with said sensor to provide a calibrating voltage applied as one input to a differential amplifier, with another input to said amplifier comprising the signal voltage from said sensor.

9. An adjustable ride height sensing system according to claim 8, wherein said external calibrator comprises a computer processor.

10. An adjustable suspension position sensing system for an automotive vehicle, comprises:
    a sensor operatively associated with the chassis and a roadwheel of said vehicle, so that electrical impedance of said sensor will be a function of the vertical position of said roadwheel with respect to said chassis; and
    means for adjusting said output signal of said sensor so that an output signal of said sensor achieves a desired range of values, with said adjustment means comprising an external calibrator operative to change to actual impedance of a network operatively associated with said sensor, wherein said network comprises a plurality of resistive elements connected with each other and with said sensor so that the actual resistance of said network may be changed by uncoupling one or more of said resistive elements from said network.

11. An adjustable suspension position sensing system according to claim 10, wherein said network is interposed between one terminal of said sensor and a power supply feeding said sensor.

12. An adjustable suspension position sensing system according to claim 10, wherein said network is interposed between one terminal of said sensor and a ground potential terminal.

13. An adjustable suspension position sensing system for an automotive vehicle according to claim 10, wherein said external calibrator comprises a computer processor.

14. An adjustable suspension position sensing system for an automotive vehicle, comprising:
    a sensor operatively associated with the chassis of a vehicle and a roadwheel, so that an output signal of said sensor will be a function of the vertical position of said roadwheel with respect to said chassis; and
    compensation means for compensating said output signal of the sensor so that an output signal of said compensation means achieves a desired range of values, with said compensation means comprising a computer processor which controls a calibrating voltage provided as one input to a differential amplifier, with said sensor providing a second input to said amplifier, so that an output signal of said amplifier may be used as said output signal of said sensor.

15. A suspension system according to claim 14 wherein said computer processor is operative to control said calibrating voltage by controlling the resistance of an electronically erasable potentiometer operatively associated with said differential amplifier.

16. An adjustable suspension position sensing system for an automotive vehicle, comprising:

a sensor operatively associated with the chassis and a roadwheel of said vehicle, so that electrical impedance of said sensor will be a function of the vertical position of said roadwheel with respect to said chassis; and means for adjusting said output signal of said sensor so that an output signal of said sensor achieves a desired range of values, with said adjustment means comprising a computer processor operative to control the resistance value of an electronically erasable potentiometer to provide a calibrating voltage applied as one input to a differential amplifier, with another input to said amplifier comprising the signal voltage from said sensor.

* * * * *